United States Patent [19]

Evans

[11] Patent Number: 5,103,784

[45] Date of Patent: Apr. 14, 1992

[54] SQUISH JET COMBUSTION CHAMBER

[75] Inventor: Robert L. Evans, West Vancouver, Canada

[73] Assignee: The Univeristy of British Columbia

[21] Appl. No.: 687,757

[22] Filed: Apr. 19, 1991

Related U.S. Application Data

[63] Continuation-in-part of Ser. No. 475,939, Feb. 7, 1990, Pat. No. 5,065,715.

[51] Int. Cl.⁵ .................. F02B 19/00; F02B 19/08
[52] U.S. Cl. ................... 123/279; 123/263; 123/661
[58] Field of Search ............ 123/262, 263, 276, 279, 123/281, 282, 293, 661

[56] References Cited

U.S. PATENT DOCUMENTS

| | | | |
|---|---|---|---|
| 1,745,884 | 2/1930 | Barnaby | 123/262 X |
| 1,754,735 | 4/1930 | Barnaby | 123/262 X |
| 2,151,218 | 3/1939 | Lutz | 123/193 P X |
| 4,166,436 | 9/1979 | Yamakawa | 123/262 |
| 4,572,123 | 2/1986 | Evans | 123/262 |

FOREIGN PATENT DOCUMENTS

| | | | |
|---|---|---|---|
| 2919371 | 11/1980 | Fed. Rep. of Germany | 123/276 |
| 146322 | 2/1981 | German Democratic Rep. | 123/276 |
| 109507 | 8/1979 | Japan | 123/276 |
| 129716 | 10/1981 | Japan | 123/263 |
| 107812 | 6/1983 | Japan | 123/279 |

Primary Examiner—Tony M. Argenbright
Attorney, Agent, or Firm—C. A. Rowley

[57] ABSTRACT

A cylinder head, more preferably a piston, of an internal combustion engine is provided on its compression face with a substantially central bowl and an annular common squish jet pocket encircling and spaced radially from the bowl to define an annular lip separating the squish pocket from the bowl. A plurality of discrete squish jet channels are formed through the lip and connect the squish pocket with the bowl at locations circumferentially spaced about the bowl. Each of the channels is open to the compression face along its full length from an inlet end connected to the annular squish jet pocket to a discharge end opening into the bowl. The channels provide the main paths for fluid flow from the area on the compression face surrounding the bowl into the bowl and in particular from the annular pocket into the bowl. The piston and cylinder are so shaped that as the piston approaches a top dead center position gases are forced from the compression face and pocket into and along the channels from the inlet end to the discharge end and are discharged into the bowl and increase the turbulence in the gases (air fuel mixture) in the bowl.

11 Claims, 4 Drawing Sheets

SQUISH JET COMBUSTION CHAMBER

This application is a continuation-in-part of application Ser. No. 07/475,939 filed Feb. 7, 1990, now U.S. Pat. No. 5,065,715.

FIELD OF THE PRESENT INVENTION

The present invention relations to a squish jet combustion chamber for internal combustion engines. More particularly the present invention relates to a squish jet combustion chamber employing open channel jet forming passages connecting a common squish pocket with a central bowl.

BACKGROUND OF THE INVENTION

The concept of utilizing squish jets in combustion chambers to increase turbulence of the air fuel mixture within the combustion chamber is known. One of the most recent designs wherein squish jets (for air or air fuel mixtures) are directed into a bowl in a manner to increase the turbulence of the air fuel mixture, particularly within the bowl, by interference between jets is disclosed in U.S. Pat. No. 4,572,123 issued Feb. 25, 1986, to Robert L. Evans. In this patent passages are formed through the piston (or cylinder head) from a compression face to discharge into a bowl at locations above the base of the bowl, i.e. between the rim and base of the bowl, the rim being substantially in the plane of the compression face. The air fuel mixture is forced through these passages by the piston movement within the cylinder particularly as the piston approaches the top dead centre position and is driven from the passages to issue as jets into the bowl. The jets are aimed to interact to increase the turbulence of the air fuel mixture in the bowl.

In the arrangement shown in the patent, the passages are tubular and thus are difficult to construct.

Many systems have been proposed where open channels have been formed in the compression face of the piston (or cylinder) leading into a suitably positioned bowl or like structure to direct the mixture of fuel and combustion gas into the bowl as jets of the air fuel mixture to enhance combustion. See for examples see the following patents: Japanese 58-107812 (A) June 1983, and 56-129716 (A) October 1981; German 2919371 November 1980; East German 146322; U.S. Pat. Nos. 1,745,884 issued Feb. 4 1930, 1,754,735 issued Apr. 15, 1930, 2,151,218 issued Mar. 21, 1939, or 4,166,436 issued Sept. 4, 1979.

BRIEF DESCRIPTION OF THE PRESENT INVENTION

It is an object of the present invention to provide a simpler structure for a squish jet combustion chamber and wherein squish jets interact with each other to increase the turbulence of the air fuel mixture within the chamber.

Broadly the present invention comprises an internal combustion engine having a piston reciprocal in a cylinder having a cylinder head, one of said cylinder head and said piston having a compression face, a bowl opening onto said compression face, a common squish jet pocket encircling said bowl and separated from said bowl by an annular lip encircling said bowl and interposed between said bowl and said annular squish pocket, a plurality of squish jet channels formed through said lip and arranged in circumferentially spaced relationship about said bowl, each said channel opening onto said face along substantially its full length from its inlet end to its discharge end, said inlet end of each said passage opening from said squish pocket and said discharge end of each said passage opening into said bowl, said channels providing conveying paths for gases from said annular squish pocket into said bowl, the other of said piston and said cylinder being shaped so that as said piston approaches a top dead centre position said gases are forced to flow from said compression face and said squish pocket through and along said channels from their respective said inlet ends to their respective said discharge ends and to discharge said air fuel mixture from said channels as jets issuing one from said discharge end of each of said channels into said bowl.

Preferably said discharge ends will be formed to direct each said jet to intersect with another of said jets.

Preferably said channels will gradually taper to a narrow width at said discharge end than said inlet end.

Preferably the depth of said channels and said pockets will continuously increase from said compression face in the direction of fluid flow through said pockets and along said channels.

Preferably said discharge ends will be arranged in adjacent pairs with said adjacent pairs of discharge ends in close proximity to direct jets issuing therefrom toward each other.

Preferably said bowl will be substantially right cylindrical with its axis substantially aligned with the reciprocal axis of said piston.

Alternatively said bowl may be provided with a substantially spherical segment at its end remote from said compression face.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

The following description is directed primarily to the piston rather than to the cylinder head since the channel squish jets of the present invention will normally be applied to the piston compression face rather than to the cylinder head compression face. However, it is also possible to incorporate channel type squish jets of the present invention to the cylinder head thus where appropriate reference to the channel squish jets and their particular pocket formations as described with respect to the piston may also be applied with appropriate revisions as required to the cylinder head.

Figure 1:
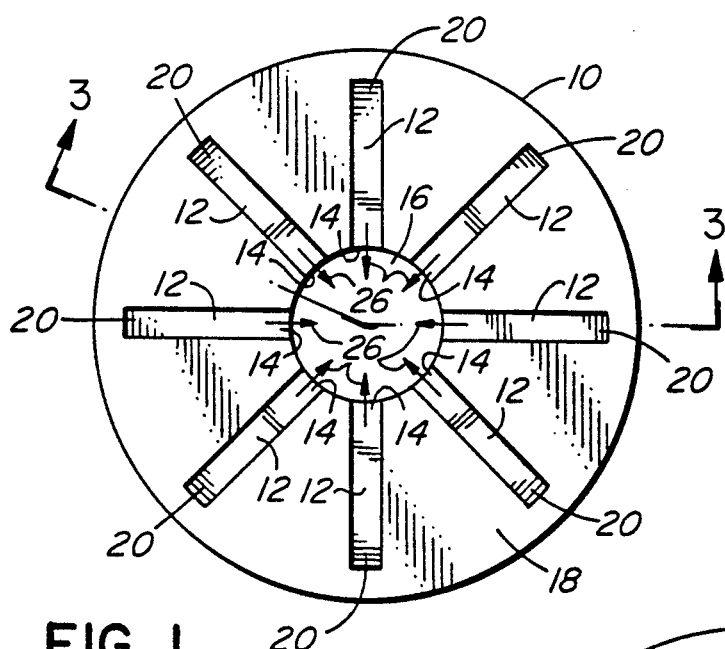
FIG. 1 is a plan view of a piston incorporating squish jet channels of the present invention.

Referring to FIG. 1, the piston 10 in the illustrated embodiment is provided with 8 squish jet channels 12 each having discharge and/or outlet ends 14 which discharges into a central bowl 16 formed coaxially with the piston 10 i.e. with the reciprocal axis of the piston. The channels 12 and bowl 16 all open onto a compression face 18 of the piston 10. In the illustrated embodiment each of the channels 12 taper in depth from a minimum depth at their inlet ends 20 remote from the bowl 16 to their discharge ends 14, i.e. the floors 22 of the channels 12 taper away from the face 18 from the inlet end 20 toward the discharge end 14 so that at the discharge end 14 the channels 12 have their maximum depth (see FIG. 3). However, in some cases the channels may not taper in depth e.g. the floors may be substantially parallel to the compression face 18.

As the piston 10 approaches the cylinder head 24 (the top dead centre position) the air fuel mixture within the cylinder is forced to flow along the channels 12 into the bowl 16 and issues from each of the channels 12, i.e. from the discharge end 14 of each channel 12 as a jet as indicated by the arrows 26.

In the FIG. 1 arrangement all of the channels 12 extend substantially radially and thus all of the jets 26 tend to intersect at the axis of the piston or centre of the bowl 16 to generate turbulence in the air fuel mixture.

In the various other figures, similar reference numerals will be used to indicate similar elements.

Figure 2:
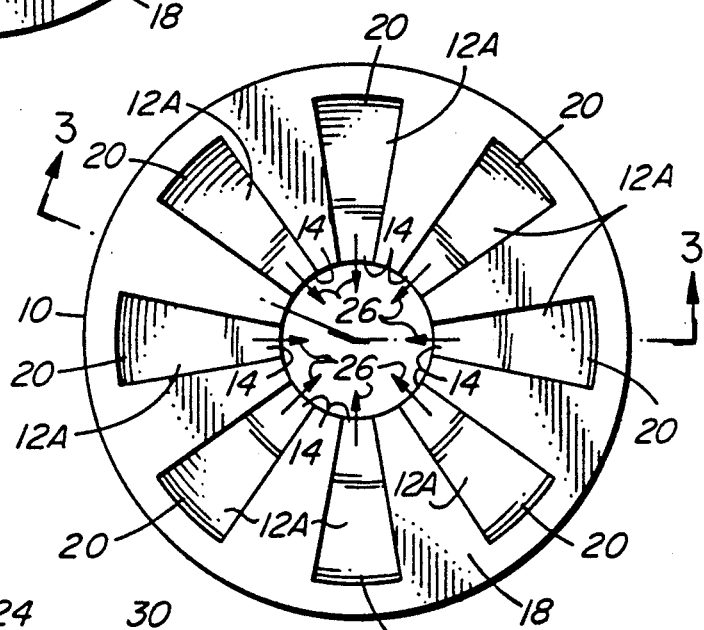
FIG. 2 is a modified version of the piston of FIG. 1.

Thus referring to FIG. 2, the channels 12A are modified relative to the channels 12 in that the channels 12A taper width wise from a maximum width adjacent their inlet ends 20 narrowing toward their discharge ends 14, i.e. each channel gradually tapers in width and becomes narrower at the discharge end 14 but otherwise embodiments of FIG. 1 and FIG. 2 are substantially the same.

Figure 4:
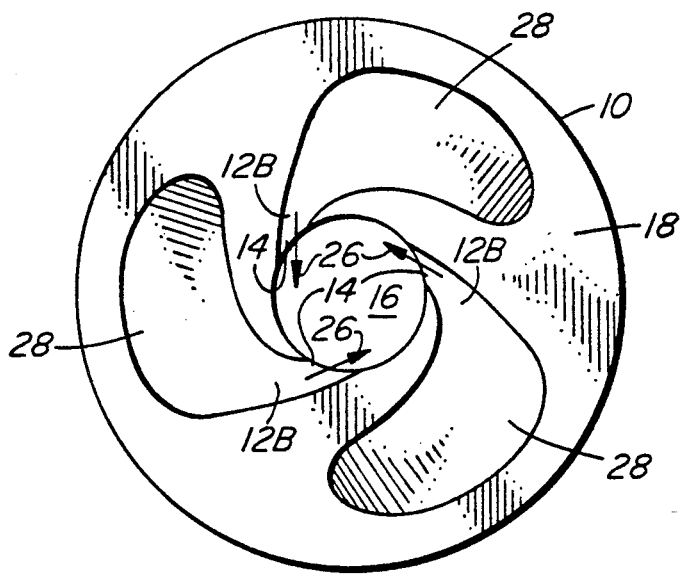
FIGS. 4, 5, 6 and 7 are plan views of alternate embodiments of the channel squish jet system of the present invention incorporating different squish pocket configurations.

In the FIG. 4 embodiment significantly fewer channels 12B have been provided and each of the channels 12B leads from a squish jet accumulation pocket 28 and discharges the air fuel mixture from each pocket via its respective channel 12B into the bowl 16. In the FIG. 4 arrangement only 3 channels 12B are shown and they are arranged to discharge substantially tangentially into the bowl 16, i.e. the jets 26 pass tangentially into the bowl 16 and tend to circulate around the bowl 16 to generate turbulence. The pockets 28 are substantially kidney shaped emptying at one end into the channels 12B (inlet end of channels 12B) and opening around its periphery onto the compression surface 18. The width of the periphery of the pockets 28 is significantly larger than the width of the passages 12B. The pockets 28 function to receive a significant quantity of the air fuel mixture and direct this air fuel mixture to their respective channels 12B as the piston approaches top dead centre. Use of such accumulating pockets 28 channels more of the air fuel mixture into each of the channels and thereby strengthens the jet formed at the discharge end 14 of the channels 12B since a larger volume of the air fuel mixture is forced into each of the channels 12B as a result of the volume of the pocket 28.

Preferably the bottom of the pockets 28 will slope downward, i.e. away from the compression surface 18 in the direction of flow of the air fuel mixture into the channel 12B and the channel 12B will continue to slope away from the compression face 18 to the discharge end 14 in the same manner as the channels 12 and 12A. The slope of the bottom of the pockets 28 will normally be less than the slope of the channels 12B and may be parallel to the surface 18.

Figure 5:
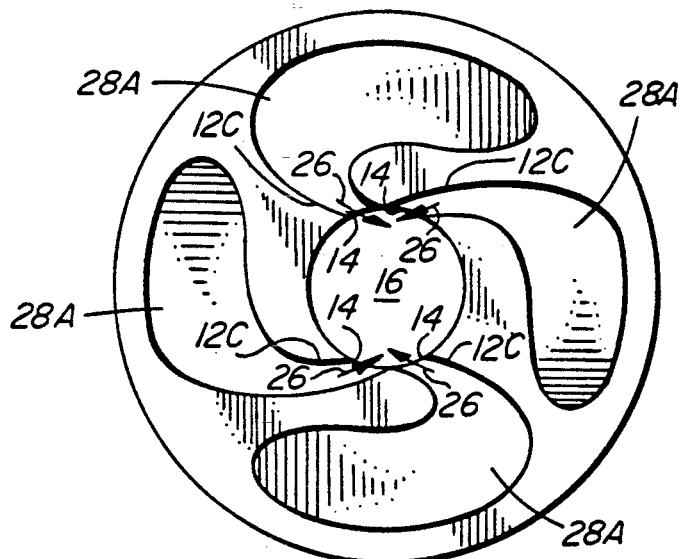

In the FIG. 5 arrangement the shape of the pockets has been changed. The pockets indicated at 28A discharge into the channels 12C which in turn discharge into the bowl 16.

As can be seen the outlet or discharge ends 14 of the channels 12C are arranged in adjacent pairs with the adjacent pairs facing one another so that the jets 26 issuing therefrom at least partially intersect each other substantially immediately after leaving their repective outlet 14 and those portions that do not intersect result in counter rotating swirls being formed in the bowl 16 to generate strong shear flows. The pockets 28A slope downward in the direction of flow of the air fuel mixture in the same manner as the pockets 28.

Figure 6:
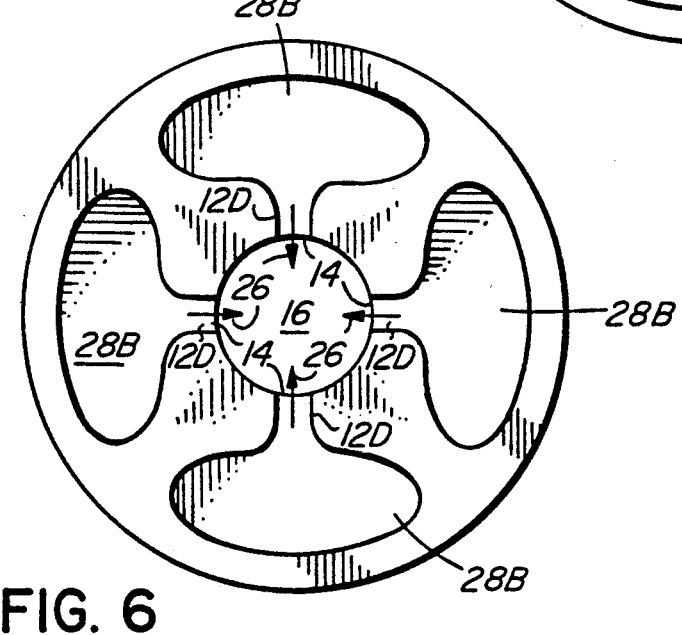

FIG. 6 is similar to the FIG. 1 arrangement in that the channels 12D extend substantially radially, however each of the channels is connected to a pocket 28B and convey the air fluid mixture from this pocket 28B into the bowl 16. Pockets 28B and their respective channels 12D combine to form substantially mushroom shaped areas opening around their peripheries onto the surface 18.

Figure 3:
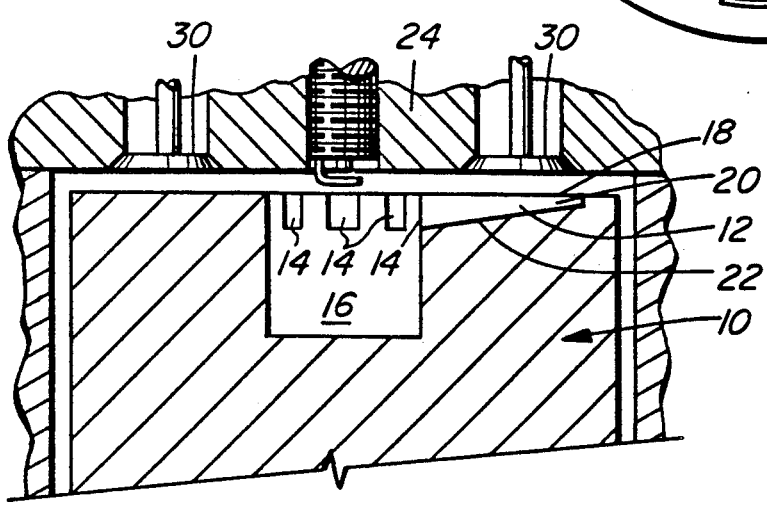
FIG. 3 is a section along the lines 3—3 of FIGS. 1 or 2.
Figure 7:
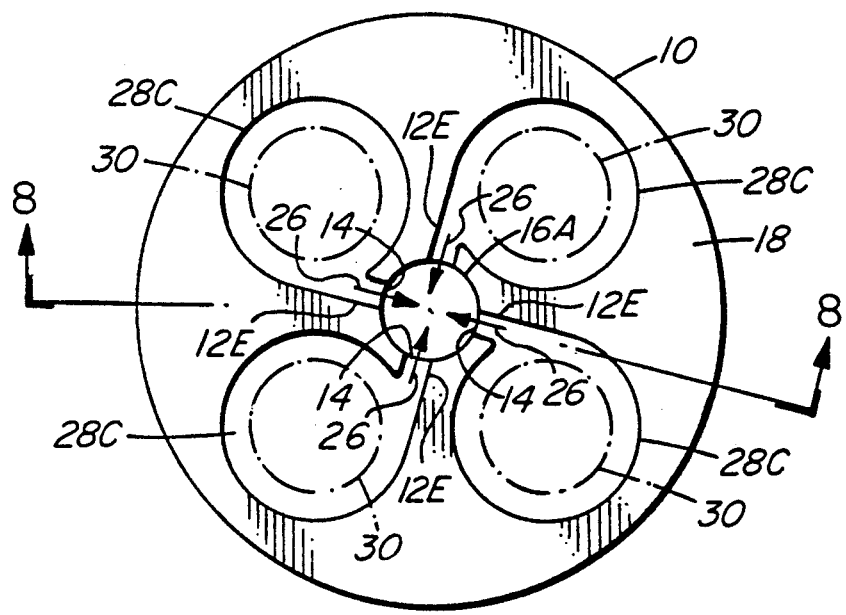
Figure 8:
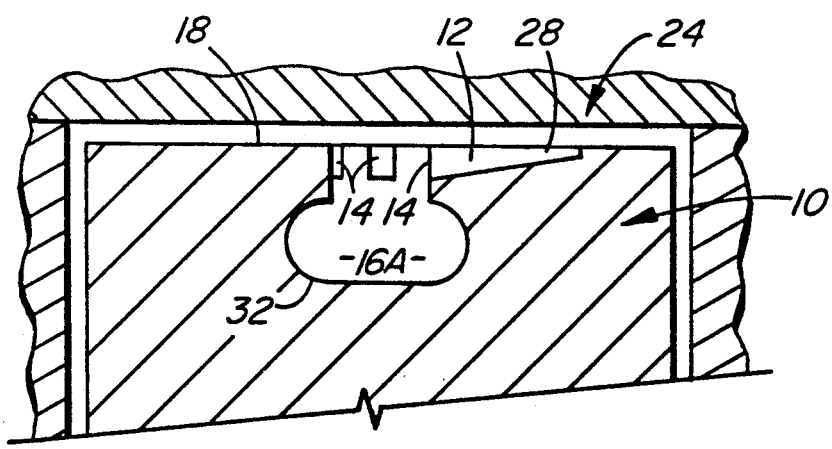
FIG. 8 is a section along the line 8—8 of FIG. 7 illustrating a modified form of bowl.

The embodiment shown in FIG. 7 is very similar to the previous embodiments however in the embodiment of FIG. 7 each of the pockets 28C is substantially circular and is positioned to receive a valve as indicated by the dot/dash lines 30 mounted in the cylinder head 24 (see FIG. 3). The FIG. 7 embodiment will normally be applied only to the piston if the pockets are to serve the valves. The channel 12E leading from each of the pockets 28C approach the bowl 16A substantially radially. The bowl 16A of FIG. 7 is a "re-entrant" bowl and thus has a different structure than that of the bowl 16 in that a portion of the bowl 16A remote from the surface 18 forms a smooth curve and may be substantially spherical or elliptical in cross section as indicated at 32. These re-entrant bowls cause the jets 26 issuing from the outlets 14 of channels 12E to tend to be deflected toward the bottom of and around the curved segment 32 to improve the turbulence (see FIG. 8).

It will be evident that the pockets such as those indicated at 28 and 28A, 28B and 28C or the widening of the passages such as the passages 12A at their ends remote from the discharge end 14 will facilitate accumulation of an air fuel mixture and ensure that a greater proportion of the air fuel mixture passes down the channels 12 (12A, 12B, 12C, 12D or 12E) to form the jets 26 issuing from the discharge ends 14 into the bowl 16 or re-entrant 16A. It will also be apparent that the re-entrant bowl 16A may be used in all the embodiment and is not restricted to the embodiments shown in FIGS. 7 and 8.

The channels 12 (12A, 12B, 12C, 12D and 12E) are preferably sized so that the restriction or resistance to flow along the channels does not significantly force fluid in the channels 12 (12A, 12B, etc.) out onto the face 18, rather the flow should be predominantly along the channels.

Figure 9:
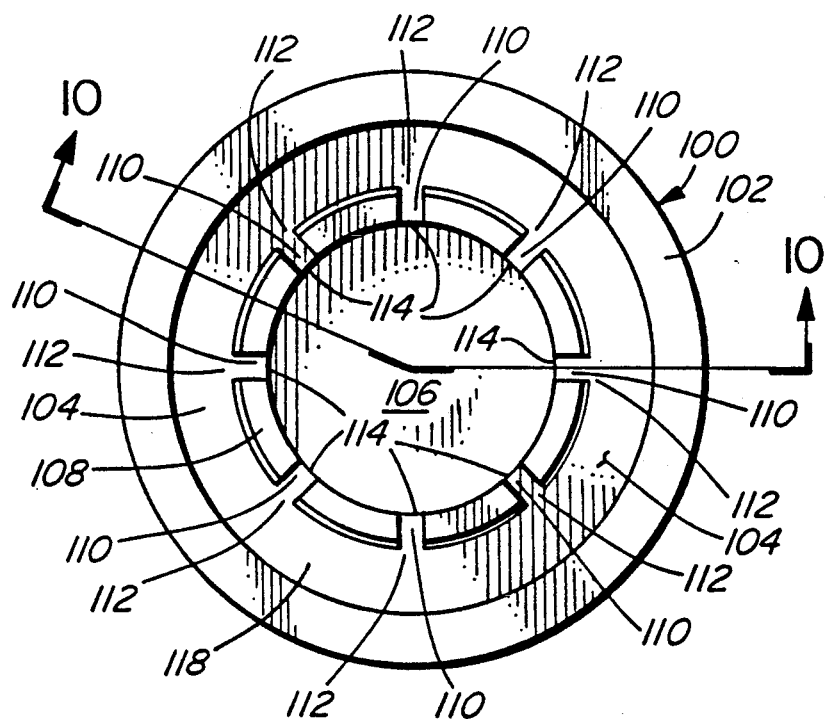
FIG. 9 is an end or plan view of a preferred embodiment of the present invention.
Figure 10:
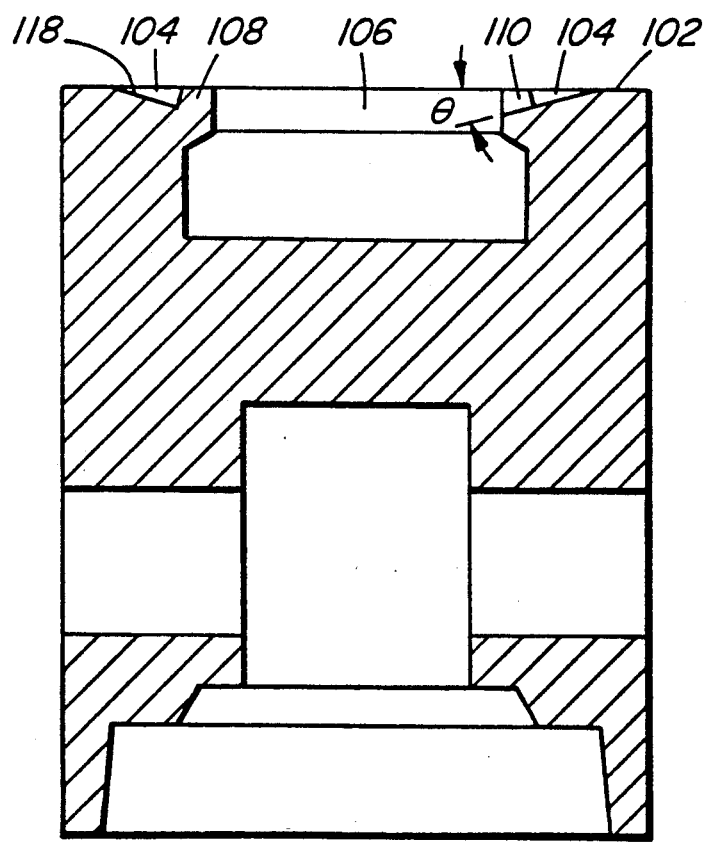
FIG. 10 is a section along the line 10—10 of FIG. 9.

Referring now to FIG. 9 and 10 illustrating another embodiment of the present invention the piston 100 is provided with a compression face 102 which provides a peripheral rim and into which is formed an annular squish pocket 104 that encircles the bowl 106 and is separated therefrom by an annular lip 108. A plurality of jet passages 110 (8 shown) are formed through the lip 108 and connect the squish pocket 104 with the bowl 106 at circumferentially spaced locations around the bowl 106. Each channel 110 has an inlet end 112 opening into the squish pocket 104 and an outlet end 114 opening into the bowl 106 and directing a jet into the bowl 106, the angular direction of the jet may be set as desired, space permitting. These jets interfere with each other and generally generate turbulence within the bowl 106.

In the arrangement illustrated in FIGS. 9 and 10 the bottom 118 of the squish pocket 104 and the bottom of the channels 110 slope toward the bowl 106 at an angle $\Theta$ of about 10° to 20° so that the size of the passages or channels 110 are increasing as the bowl is approached. However if desired the bottom of the pocket 104 and/or the channels 110 may be at other selected orientations to the compression face i.e. to the direction of travel of the piston, for example the bottoms of the pocket 104 and channel 110 may be parallel to the compression face i.e. perpendicular to the direction of movement of the piston.

It will be apparent that the annular arrangement of the Pocket 104 surrounding the bowl 106 permit relatively easy fabrication i.e. the pocket 104, bowl 106 lip 108 and passages 110 may simply be machined or moulded into the face of the piston 100 at relatively minor cost.

It will also be apparent that the channels 110 may be directed substantially radially into the bowl 106 as illustrated or tangentially or at any selected direction, for example oriented in manner to direct the jets in the directions illustrated for the jets 26 in FIGS. 4 or 5.

The description has been primarily with reference to air fuel mixtures, however it is equally applicable to diesel type engines or the like wherein the air and fuel are introduced separately, in these engines turbulence is developed in the air and the fuel is injected into the turbulent air in the cylinder, preferably into the bowl 16, 16A or 106.

Having described the invention, modifications will be evident to those skilled in the art without departing from the spirit of the invention as defined in the appended claims.

I claim:

1. An internal combustion engine having a piston reciprocal in a cylinder having a cylinder head, one of said cylinder head and said piston having a compression face, a bowl opening onto said compression face, an annular squish jet pocket encircling said bowl and separated from said bowl by an annular lip encircling said bowl and interposed between said bowl and said annular squish jet pocket, a plurality of squish jet channels formed through said lip and arranged in circumferentially spaced relationship about said bowl, each said channel opening onto said face along substantially its full length from its inlet end to its discharge end, said inlet end of each said passage opening from said annular squish jet pocket and said discharge end of each said passage opening into said bowl, said channels providing conveying paths for gases from said annular squish jet pocket into said bowl, the other of said piston and said cylinder being shaped so that as said piston approaches a top dead centre position said gases are forced to flow from said compression face and said annular squish jet pocket through and along said channels from their respective said inlet ends to their respective said discharge ends and to discharge said air fuel mixture from said channels as jets issuing from said discharge end of each of said channels into said bowl.

2. An engine as defined in claim 1 wherein said discharge ends are positioned to direct each said jet to intersect with another of said jets.

3. An engine as defined in claim 1 wherein said channels gradually increase in depth measured from said compression face from said inlet end to said outlet end.

4. An engine as defined in claim 2 wherein said squish pocket gradually increases in depth measured from said compression face from its end remote from said bowl to its end at said inlet ends of said channels.

5. An engine as defined in claim 3 wherein said squish pocket gradually increases in depth measured from said compression face from its end remote from said bowl to its end at said inlet ends of said channels.

6. An engine as defined in claim 2 wherein said channels gradually increase in depth measured from said compression face from said inlet end to said outlet end.

7. An engine as defined in claim 6 wherein said squish pocket gradually increases in depth measured from said compression face from its end remote from said bowl to its end at said inlet ends of said channels.

8. An engine as defined in claim 1 wherein the depth of said channels and said pocket measured from said compression face continuously increase in the direction of fluid flow through said pocket and along said channels into said bowl.

9. An engine as defined in claim 2 wherein the depth of said channels and said pocket measured from said compression face continuously increase in the direction of fluid flow through said pocket and along said channels into said bowl.

10. An engine as defined in claim 3 wherein the depth of said channels and said pocket measured from said compression face continuously increase in the direction of fluid flow through said pocket and along said channels into said bowl.

11. An engine as defined in claim 6 wherein the depth of said channels and said pocket measured from said compression face continuously increase in the direction of fluid flow through said pocket and along said channels into said bowl.

* * * * *